United States Patent
Pombo et al.

(10) Patent No.: US 10,393,312 B2
(45) Date of Patent: Aug. 27, 2019

(54) ARTICULATING COMPONENTS FOR A HEAD-MOUNTED DISPLAY

(71) Applicant: RealWear, Incorporated, Milpitas, CA (US)

(72) Inventors: Stephen A. Pombo, Campbell, CA (US); George Henry Hines, San Francisco, CA (US)

(73) Assignee: RealWear, Inc., Vacouver, WA (US)

( * ) Notice: Subject to any disclaimer, the term of this patent is extended or adjusted under 35 U.S.C. 154(b) by 0 days.

(21) Appl. No.: 15/390,375

(22) Filed: Dec. 23, 2016

(65) Prior Publication Data

US 2018/0180218 A1    Jun. 28, 2018

(51) Int. Cl.
| | |
|---|---|
| A45F 5/00 | (2006.01) |
| A45F 5/02 | (2006.01) |
| F16M 13/04 | (2006.01) |
| H04N 5/225 | (2006.01) |

(52) U.S. Cl.
CPC .............. *F16M 13/04* (2013.01); *A45F 5/00* (2013.01); *A45F 5/02* (2013.01); *F16M 2200/024* (2013.01); *F16M 2200/06* (2013.01); *H04N 5/2253* (2013.01)

(58) Field of Classification Search
CPC ............. F16M 13/04; F16M 2200/024; F16M 2200/06; A45F 5/00
See application file for complete search history.

(56) References Cited

U.S. PATENT DOCUMENTS

| | | |
|---|---|---|
| 4,944,361 A | 7/1990 | Lindgren et al. |
| 5,046,192 A | 9/1991 | Ryder |
| 5,185,807 A | 2/1993 | Bergin et al. |
| 5,767,820 A | 6/1998 | Bassett et al. |
| 5,796,374 A | 8/1998 | Cone et al. |
| 5,806,079 A | 9/1998 | Rivette et al. |
| 5,815,126 A | 9/1998 | Fan et al. |
| 5,850,211 A | 12/1998 | Tognazzini |
| 5,882,137 A * | 3/1999 | Epp .................. B60G 7/005 403/122 |
| 5,977,935 A | 11/1999 | Yasukawa et al. |
| 6,061,064 A | 5/2000 | Reichlen |

(Continued)

OTHER PUBLICATIONS

Non-Final Office Action dated Jan. 9, 2018 in U.S. Appl. No. 15/390,363, 14 pages.

(Continued)

*Primary Examiner* — Ariel A Balaoing
(74) *Attorney, Agent, or Firm* — Shook, Hardy & Bacon L.L.P.

(57) ABSTRACT

A device wearable upon a head of a user with an adjustable assembly is provided. The device may comprise a first assembly including a wearable portion, an arm having a first end portion and a second end portion positioned at an end of the arm opposite to the first end portion, and a first connector connected between the first assembly and the first end portion of the arm, the first connector including a detent assembly configured to releasably hold the arm in an in-use position at a first distance from the head of the user and in a stand-by position at a second distance greater than the first distance. The device may further include a second connector connected to the second end portion of the arm, and an output display connected to the second connector.

8 Claims, 8 Drawing Sheets

(56) References Cited

U.S. PATENT DOCUMENTS

| | | |
|---|---|---|
| 6,198,462 B1 | 3/2001 | Daily et al. |
| 6,352,228 B1* | 3/2002 | Buerklin ............ F16C 11/106 248/181.1 |
| 6,434,250 B1 | 8/2002 | Tsuhako |
| 6,456,262 B1 | 9/2002 | Bell |
| 6,587,700 B1 | 7/2003 | Meins et al. |
| 6,637,883 B1 | 10/2003 | Tengshe et al. |
| 6,708,339 B1 | 3/2004 | Smith |
| 6,747,611 B1 | 6/2004 | Budd et al. |
| 6,867,752 B1 | 3/2005 | Yamazaki et al. |
| 7,103,841 B2 | 9/2006 | Ronkainen et al. |
| 7,113,170 B2 | 9/2006 | Lauper et al. |
| 7,124,425 B1 | 10/2006 | Anderson, Jr. et al. |
| 7,245,737 B2 | 7/2007 | Amae et al. |
| 7,453,451 B1 | 11/2008 | Maguire, Jr. |
| 7,853,050 B2 | 12/2010 | Wang et al. |
| 7,928,926 B2 | 4/2011 | Yamamoto et al. |
| 8,378,924 B2 | 2/2013 | Jacobsen et al. |
| 8,531,355 B2 | 9/2013 | Maltz |
| 8,643,951 B1 | 2/2014 | Wheeler et al. |
| 8,706,685 B1 | 4/2014 | Smith et al. |
| 8,743,021 B1 | 6/2014 | Park et al. |
| 8,751,969 B2 | 6/2014 | Matsuda et al. |
| 8,855,719 B2 | 10/2014 | Jacobsen et al. |
| 8,922,481 B1 | 12/2014 | Kauffmann et al. |
| 8,929,589 B2 | 1/2015 | Publicover et al. |
| 8,990,682 B1 | 3/2015 | Wong et al. |
| 9,075,249 B2 | 7/2015 | Heinrich et al. |
| 9,122,307 B2 | 9/2015 | Jacobsen et al. |
| 9,134,793 B2 | 9/2015 | McDonald et al. |
| 9,164,588 B1 | 10/2015 | Johnson et al. |
| 9,240,069 B1 | 1/2016 | Li |
| 9,294,607 B2 | 3/2016 | Jacobsen et al. |
| 9,301,085 B2 | 3/2016 | Parkinson et al. |
| 9,377,852 B1 | 6/2016 | Shapiro et al. |
| 9,377,862 B2 | 6/2016 | Parkinson et al. |
| 9,442,631 B1 | 9/2016 | Patel et al. |
| 9,477,888 B1 | 10/2016 | Lewis |
| 9,500,867 B2 | 11/2016 | Hennelly et al. |
| 9,588,593 B2 | 3/2017 | Li |
| 9,615,067 B1 | 4/2017 | Foote et al. |
| 9,658,451 B2 | 5/2017 | Kobayashi |
| 9,817,232 B2 | 11/2017 | Lindley et al. |
| 9,823,742 B2 | 11/2017 | Parker et al. |
| 9,904,369 B2 | 2/2018 | Lai et al. |
| 9,913,302 B2 | 3/2018 | Parkinson et al. |
| 9,916,006 B2 | 3/2018 | Maltz |
| 9,940,754 B2 | 4/2018 | Kuribara |
| 9,946,079 B2 | 4/2018 | Ozeki |
| 10,013,053 B2 | 7/2018 | Cederlund et al. |
| 10,013,976 B2 | 7/2018 | Woodall et al. |
| 10,048,750 B2 | 8/2018 | Du et al. |
| 10,078,416 B2 | 9/2018 | Tsuda |
| 2002/0037770 A1 | 3/2002 | Paul et al. |
| 2002/0044152 A1 | 4/2002 | Abbott, III et al. |
| 2002/0190947 A1 | 12/2002 | Feinstein |
| 2003/0020707 A1 | 1/2003 | Kangas et al. |
| 2003/0182713 A1 | 10/2003 | Rolla |
| 2004/0008158 A1 | 1/2004 | Chi et al. |
| 2004/0218776 A1 | 11/2004 | Rolla |
| 2005/0083248 A1 | 4/2005 | Biocca et al. |
| 2006/0044265 A1 | 3/2006 | Min |
| 2006/0048286 A1 | 3/2006 | Donato |
| 2007/0024507 A1* | 2/2007 | Kasamatsu ............ H01Q 1/24 343/702 |
| 2007/0052672 A1 | 3/2007 | Ritter et al. |
| 2007/0130547 A1 | 6/2007 | Boillot |
| 2007/0171193 A1 | 7/2007 | Nakamura |
| 2007/0183616 A1 | 8/2007 | Wahl et al. |
| 2007/0211023 A1 | 9/2007 | Boillot |
| 2007/0220108 A1 | 9/2007 | Whitaker |
| 2009/0099836 A1 | 4/2009 | Jacobsen et al. |
| 2009/0100732 A1 | 4/2009 | Seidler |
| 2009/0128448 A1 | 5/2009 | Riechel |
| 2009/0154990 A1* | 6/2009 | Julliere ............ F16C 33/1095 403/141 |
| 2009/0195652 A1 | 8/2009 | Gal |
| 2010/0194350 A1 | 8/2010 | Chatterjee et al. |
| 2010/0259471 A1 | 10/2010 | Takano et al. |
| 2010/0315329 A1 | 12/2010 | Previc et al. |
| 2010/0328204 A1 | 12/2010 | Edwards et al. |
| 2011/0001699 A1 | 1/2011 | Jacobsen et al. |
| 2011/0090135 A1 | 4/2011 | Tricoukes et al. |
| 2011/0187640 A1 | 8/2011 | Jacobsen et al. |
| 2011/0249122 A1 | 10/2011 | Tricoukes et al. |
| 2012/0050143 A1 | 3/2012 | Border et al. |
| 2012/0062444 A1 | 3/2012 | Cok et al. |
| 2012/0068914 A1 | 3/2012 | Jacobsen et al. |
| 2012/0086624 A1 | 4/2012 | Thompson et al. |
| 2012/0192065 A1 | 7/2012 | Migos et al. |
| 2012/0235896 A1 | 9/2012 | Jacobsen et al. |
| 2012/0235902 A1 | 9/2012 | Eisenhardt et al. |
| 2012/0236025 A1 | 9/2012 | Jacobsen et al. |
| 2012/0272179 A1 | 10/2012 | Stafford |
| 2012/0272484 A1* | 11/2012 | Willborn ............ A61F 9/025 24/3.11 |
| 2012/0287284 A1 | 11/2012 | Jacobsen et al. |
| 2013/0007672 A1 | 1/2013 | Taubman |
| 2013/0007686 A1 | 1/2013 | Lu |
| 2013/0021269 A1 | 1/2013 | Johnson et al. |
| 2013/0047322 A1 | 2/2013 | Peebles |
| 2013/0054576 A1 | 2/2013 | Karmarkar et al. |
| 2013/0069985 A1 | 3/2013 | Wong et al. |
| 2013/0089214 A1 | 4/2013 | Tricoukes et al. |
| 2013/0135353 A1 | 5/2013 | Wheeler et al. |
| 2013/0169514 A1 | 7/2013 | Edwards et al. |
| 2013/0187835 A1 | 7/2013 | Vaught et al. |
| 2013/0231937 A1 | 9/2013 | Woodall et al. |
| 2013/0239000 A1 | 9/2013 | Parkinson et al. |
| 2013/0241805 A1 | 9/2013 | Gomez |
| 2013/0246967 A1 | 9/2013 | Wheeler et al. |
| 2013/0285886 A1 | 10/2013 | Pombo et al. |
| 2013/0321255 A1 | 12/2013 | Lamb et al. |
| 2013/0326208 A1 | 12/2013 | Jacobsen et al. |
| 2014/0000015 A1 | 1/2014 | Arai |
| 2014/0002357 A1 | 1/2014 | Pombo et al. |
| 2014/0028923 A1 | 1/2014 | Griffin et al. |
| 2014/0043214 A1 | 2/2014 | Park et al. |
| 2014/0098132 A1 | 4/2014 | Fein et al. |
| 2014/0111427 A1 | 4/2014 | Lindley et al. |
| 2014/0153173 A1 | 6/2014 | Pombo et al. |
| 2014/0195247 A1 | 7/2014 | Parkinson et al. |
| 2014/0253605 A1 | 9/2014 | Border et al. |
| 2014/0267419 A1 | 9/2014 | Ballard et al. |
| 2014/0268054 A1 | 9/2014 | Olsson et al. |
| 2014/0282278 A1 | 9/2014 | Anderson et al. |
| 2014/0380230 A1 | 12/2014 | Venable et al. |
| 2015/0009132 A1 | 1/2015 | Kuriya et al. |
| 2015/0102984 A1 | 4/2015 | Wong et al. |
| 2015/0142440 A1 | 5/2015 | Parkinson et al. |
| 2015/0153571 A1 | 6/2015 | Ballard et al. |
| 2015/0206321 A1 | 7/2015 | Scavezze et al. |
| 2015/0213778 A1 | 7/2015 | Moravetz |
| 2015/0220142 A1 | 8/2015 | Parkinson et al. |
| 2015/0288666 A1 | 10/2015 | Rao et al. |
| 2015/0309316 A1 | 10/2015 | Osterhout et al. |
| 2016/0026253 A1 | 1/2016 | Bradski et al. |
| 2016/0077337 A1 | 3/2016 | Raffle et al. |
| 2016/0093105 A1 | 3/2016 | Rimon et al. |
| 2016/0162020 A1 | 6/2016 | Lehman et al. |
| 2016/0178912 A1 | 6/2016 | Kusuda et al. |
| 2016/0259862 A1 | 9/2016 | Navanageri et al. |
| 2016/0324248 A1 | 11/2016 | Winters et al. |
| 2016/0329634 A1 | 11/2016 | Osterhout et al. |
| 2016/0342782 A1 | 11/2016 | Mullins et al. |
| 2016/0370855 A1 | 12/2016 | Lanier et al. |
| 2017/0017464 A1 | 1/2017 | Roy |
| 2017/0060230 A1 | 3/2017 | Faaborg et al. |
| 2017/0092002 A1 | 3/2017 | Mullins et al. |
| 2017/0115728 A1 | 4/2017 | Park et al. |
| 2017/0160812 A1 | 6/2017 | Park et al. |
| 2017/0168305 A1* | 6/2017 | Kusuda ............ G02B 27/0172 |
| 2017/0337897 A1 | 11/2017 | Jung et al. |

(56) References Cited

U.S. PATENT DOCUMENTS

| | | |
|---|---|---|
| 2017/0351393 A1 | 12/2017 | Ott et al. |
| 2017/0351778 A1 | 12/2017 | Sperling |
| 2018/0011326 A1 | 1/2018 | Ishizaki |
| 2018/0143756 A1 | 5/2018 | Mildrew et al. |
| 2018/0276896 A1 | 9/2018 | Launonen |
| 2018/0356884 A1 | 12/2018 | Lee |

OTHER PUBLICATIONS

International Search Report dated Feb. 16, 2018 in International Patent Application No. PCT/US2017/066656, 15 pages.

International Search Report and Written Opinion dated Apr. 13, 2018 in International Patent Application No. PCT/US2017/064904, 13 pages.

International Search Report and Written Opinion dated Apr. 20, 2018 in International Patent Application No. PCT/US2017/064904, 12 pages.

The RealWear HMI-1 can be used with both hard hat and safety glasses #safetyfirst #msasafety #iiot #wearables @realheadwear inc (Realwear Inc) Sep. 15, 2016 (Sep. 15, 2016), available at: <www.facebook.com/RealWearInc/>, entire document.

"Andy Lowery on the Industrial Internet" (Techonomy Media) Nov. 30, 2016 (Nov. 30, 2016), available at: <https://www.youtube.com/watch?v=OCIQM5aV5o4&feature=youtu.be>, entire document,especially at (2:10).

International Search Report and Written Opinion dated Jan. 19, 2018 in International Patent Application No. PCT/US2017/064898, 12 pages.

International Search Report and Written Opinion dated Feb. 23, 2018 in International Patent Application No. PCT/US2017/064905, 9 pages.

International Search Report and Written Opinion dated Mar. 5, 2018 in International Patent Application No. PCT/US2017/068123, 9 pages.

Final Office Action dated Aug. 2, 2018 in U.S. Appl. No. 15/390,363, 16 pages.

Non-Final Office Action dated Sep. 26, 2018 in U.S. Appl. No. 15/390,380, 14 pages.

First Action Interview Pre-Interview Communication dated Nov. 16, 2018 in U.S. Appl. No. 15/697,214, 7 pages.

First Action Interview Pre-Interview Communication dated Nov. 21, 2018 in U.S. Appl. No. 15/390,389, 8 pages.

Non-Final Office Action dated Dec. 5, 2018 in U.S. Appl. No. 15/390,363, 9 pages.

Final Office Action dated Feb. 1, 2019 in U.S. Appl. No. 15/390,375, 8 pages.

First Action Interview Office Action dated Feb. 7, 2019 in U.S. Appl. No. 15/697,214, 29 pages.

First Action Interview Pre-Interview Communication dated Feb. 19, 2019 in U.S. Appl. No. 15/390,191, 11 pages.

Notice of Allowance dated Mar. 21, 2019 in U.S. Appl. No. 15/390,380, 7 pages.

First Action Interview Office Action dated Apr. 12, 2019 in U.S. Appl. No. 15/390,191, 7 pages.

Final Office Action dated May 2, 2019 in U.S. Appl. No. 15/390,389, 27 pages.

* cited by examiner

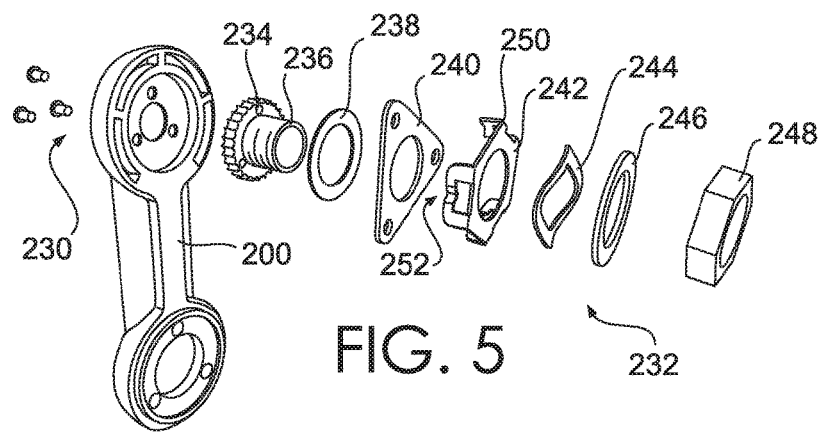
FIG. 5
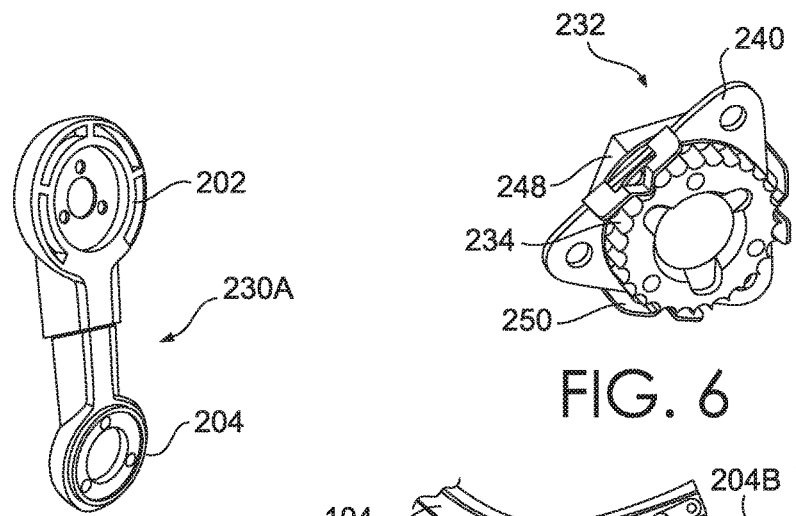
FIG. 6
FIG. 7
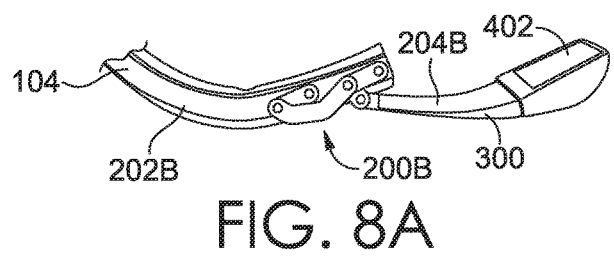
FIG. 8A
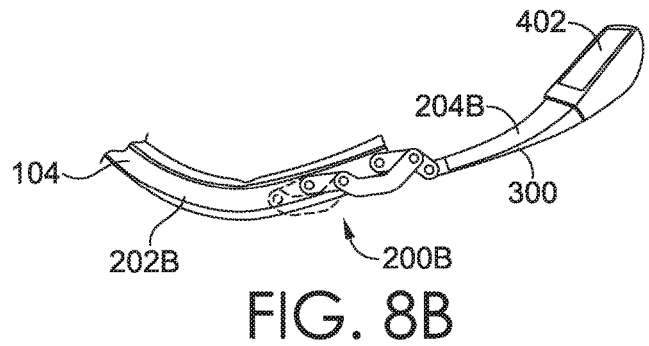
FIG. 8B

ARTICULATING COMPONENTS FOR A HEAD-MOUNTED DISPLAY

CROSS-REFERENCE TO RELATED APPLICATIONS

This application is related by subject matter to the following U.S. Patent Applications filed on the same date: U.S. patent application Ser. No. 15/390,389, entitled "ELECTRONIC DOCUMENT NAVIGATION ON A HEAD-MOUNTED DISPLAY,"; U.S. patent application Ser. No. 15/390,363, entitled "INTERCHANGEABLE OPTICS FOR A HEAD-MOUNTED DISPLAY,"; U.S. patent application Ser. No. 15/390,380, entitled "MODULAR COMPONENTS FOR A HEAD-MOUNTED DISPLAY,"; and U.S. patent application Ser. No. 15/390,191, entitled "HANDS-FREE NAVIGATION OF TOUCH-BASED OPERATING SYSTEMS,". Each of these referenced applications is incorporated herein by reference in its entirety.

FIELD OF THE DISCLOSURE

The disclosure relates to a system and method for positioning a head-mounted electronic display unit, and in particular, positioning and repositioning a display unit in close proximity to the eye.

BACKGROUND OF THE DISCLOSURE

A head-mounted display, or HMD, can be monocular or binocular. There are also such displays which can be looked through while displaying information. Such displays can be supported by eyeglasses, a visor, a strap around the head, or a frame resting upon the head, or the display can be attached to a hat or helmet.

SUMMARY OF THE DISCLOSURE

In one embodiment, a device wearable upon a head of a user is provided. The device comprises a first assembly including a wearable portion, an arm having a first end portion and a second end portion positioned at an end of the arm opposite to the first end portion, a first connector connected between the first assembly and the first end portion of the arm, the first connector including a detent assembly configured to releasably hold the arm in an in-use position at a first distance from the head of the user, and in a stand-by position at a second distance greater than the first distance, a second connector connected to the second end portion of the arm, and an output display connected to the second connector to be positionable within a field of view of the user when the arm is in the in-use position.

In another embodiment, a device wearable upon a head of a user is provided. The device comprises a first assembly including a wearable portion, an arm having a first end portion connected to the first assembly and a second end portion positioned at an end of the arm opposite to the first end portion, an output display, and a connector connected to the second end portion of the arm and the output display, the connector including a spherical extension, a spherical bearing sized and dimensioned to mateably receive a portion of the spherical extension, one of the spherical extension and the spherical bearing being connected to the connector, and the other of the spherical extension and the spherical bearing being connected to the output display, the first and second attachment ends positionable with respect to each other by movement of the spherical extension within the bearing to enable a positioning of the output display with respect to a visual field of the user when the device is worn.

In another embodiment, a device wearable upon a head of a user is provided. The device comprises a first assembly including a wearable portion, an arm having a first end portion connected to the first assembly, a second end portion positioned at an end of the arm opposite to the first end portion, and a slidable extension mechanism disposed between the first end portion and the second end portion configured to enable a change in distance between the first end portion and the second end portion, a display connector connected to the arm, and an output display connected to the display connector to be positionable within a field of view of the user, the slidable extension mechanism slideable to change a position of the output display relative to the head of the user.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings, wherein:

FIG. 5 is an exploded view of a proximal arm of the device of FIG. 1;

FIG. 6 is a perspective view of a detent mechanism of FIG. 5;

FIG. 7 depicts a perspective view of a telescoping proximal arm of the disclosure;

FIG. 8A depicts an alternative form of a movable proximal arm of the disclosure, in a retracted orientation;

FIG. 8B depicts the proximal arm of FIG. 8A, in an extended orientation;

DETAILED DESCRIPTION OF THE DISCLOSURE

Figure 1:
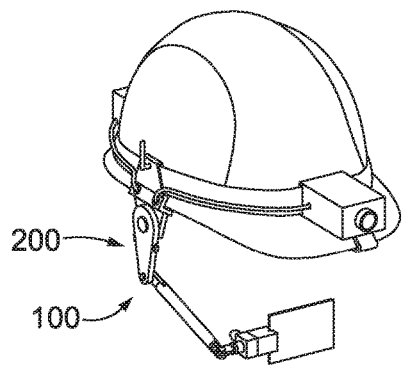
FIG. 1 depicts an output display supporting device of the disclosure mounted upon an industrial hard hat.

As required, detailed embodiments are disclosed herein; however, it is to be understood that the disclosed embodiments are merely examples and that the systems and methods described herein can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term "plurality," as used herein, is defined as two or more than two. The term "another," as used herein, is defined as at least a second or more. The terms "including" and "having," as used herein, are defined as comprising (i.e., open language). The term "coupled," as used herein, is defined as "connected," although not necessarily directly, and not necessarily mechanically.

With reference to FIGS. 1-4, a device 100 includes a base 110, a proximal arm 200, a distal arm 300, a display mount 400, and a display 402 output device. Device 100 can further include a camera connector 500 and a camera 502. In one embodiment, a coupling 230 is provided at a connection between proximal arm 200 and base 110. In the same or another embodiment, a coupling 260 is provided at a connection between the proximal and distal arms 200, 300.

Herein, while a proximal and distal arm 200, 300 is shown and described, it should be understood that together they may be considered to form a single boom arm for supporting an output video, the single boom arm having one or more intermediate connector portions. Further, in various embodiments, they may be formed of a unitary part with no intermediate connector, or they may, together, form a single telescoping arm.

Figure 3:
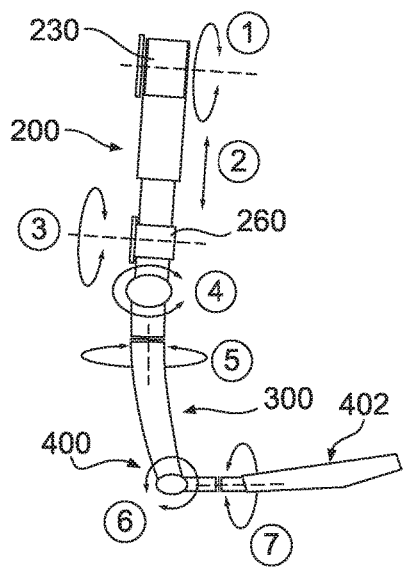
FIG. 3 is a diagrammatic view of movements enabled by the device of FIG. 1.
Figure 4:
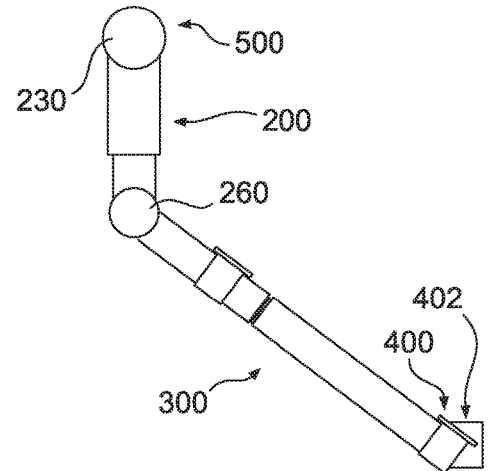
FIG. 4 is a side view of the diagram of FIG. 3.

With reference to FIG. 3, a diagrammatic embodiment of the device 100 enables one or more of seven different motions which enable a positioning of display 402 either in a user's field of view, or out of a user's field of view. Each of the movements is indicated by arrows next to a number within a circle, in which:

movement 1 represents a tilting up and down at coupling 230, for example through a range of about 130 degrees;

movement 2 represents a fore/aft change in length fore and aft of proximal arm 200, for example through a range of about 40 mm;

movement 3 represents a tilting up and down of distal arm 300 relative to proximal arm 200, at coupling 260, for example through a range of about 225 degrees;

movement 4 represents a pivoting left and right of distal arm 300 relative to proximal arm 200, which may be within coupling 260, or at another location on distal arm 300 as illustrated, for example through a range of about 45 degrees;

movement 5 represents an axial twisting of distal arm 300, for example through a range of about 20 degrees;

movement 6 represents a lateral movement of display 402 relative to distal arm 300, for example through a range of about 20 degrees; and movement 7 represents an axial twisting of display 402 along its long axis, for example through a range of about 60 degrees.

The above-mentioned lengths and angular ranges may vary substantially from the examples, based upon a sizing of device 100, for example for men or women, or for children, or for variations of design consistent with the disclosure. The term 'about' refers to variation of up to 30 percent, although greater variation, or no adjustment at all, can be provided.

Referring now to FIGS. 5-6, a detent mechanism 232 enables pivoting of coupling 230 with predetermined stop positions, for example at every 15 degrees of rotation, although more or fewer detents can be provided to change this angle. This pivot provides motion corresponding to movement 1. Detent mechanism 232 connects proximal arm 200 to base 110. More particularly, detent gear 234 is affixed to proximal arm 200, and has a threaded shaft 236 which passes through a friction washer 238, mounting plate 240, detent spring 242, friction washer 244, washer 246, and nut 248. Detent spring 238 is rotationally affixed to mounting plate 236 by folded detent engaging cam springs 250, which include a cam surface 252. Mounting plate 240 is affixed to base 110, to thereby affix proximal arm 230 to base 110.

FIG. 7 depicts proximal arm 230A, in which an upper proximal arm segment 202 retains a lower proximal arm segment 204. In the embodiment shown, segment 204 has a smaller exterior dimension than segment 202, and is shaped to telescope into segment 202. Other attachment mechanisms can be provided for changing a length of proximal arm 230A, for example, as described elsewhere herein with respect to distal arm 300, or using other geared or frictional retaining mechanisms. This configuration provides motion corresponding to movement 2, as does the following configuration of FIGS. 8A-8B. As such, by changing a length of proximal arm 200, display 402 can be positioned higher or lower, and closer or farther, from the eye of a wearer or user of device 100, the relative height or distance change dependent upon a given rotational angle of connector 260.

FIGS. 8A-8B depict proximal arm 200B, in which an upper proximal arm segment 202B is affixed to a yoke 104 which engages a wearer's head. A lower proximal arm segment 204B is movably coupled to the upper proximal arm segment 202B with a mechanical linkage that is movable between a retracted position, as shown in FIG. 8A, and an extended position, as shown in FIG. 8B. The mechanical linkage may, for example, include one or more movably coupled linkages that can be adjusted in coordination to change the position of the display 402. In FIG. 8A, the lower proximal arm segment 204B is fully retracted to abut against the upper proximal arm segment 202B, such as to more easily allow the proximal arm 200B to be pivoted between different positions, and in FIG. 8B, the lower proximal arm segment 204B is extended outwardly, such as into a display position that provides a more desirable viewing angle for a wearer. A maximal extension distance from the upper proximal arm segment 202B may be, for example, about 40 mm. The retracted position shown in FIG. 8A may more easily allow movement of the proximal arm 200B adjacent a wearer's head, and this movement may be hands-free, such as through motor function, memory wire, and/or other movement actuators.

Figure 9:
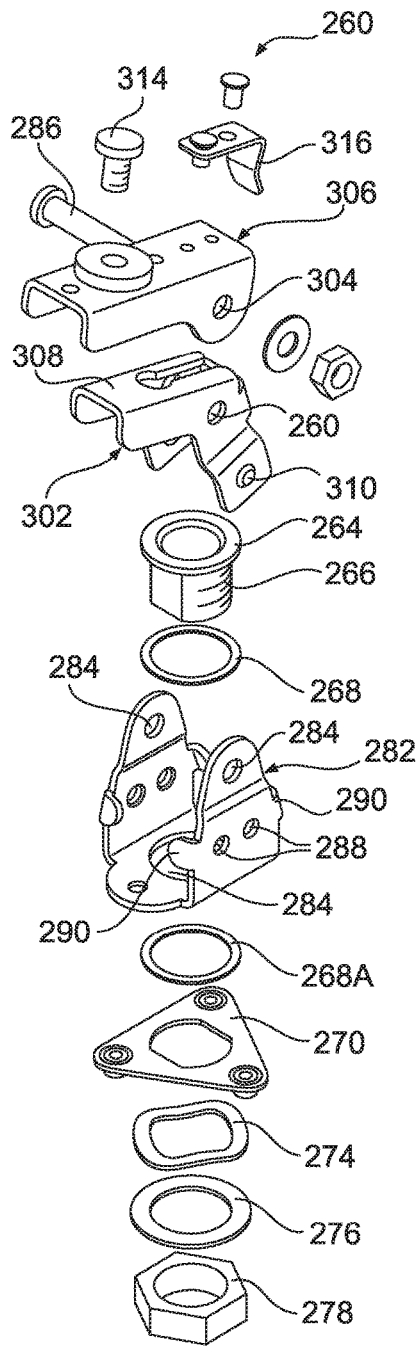
FIG. 9 is an exploded view of a connector positioned between proximal and distal arms of the disclosure.
Figure 10:
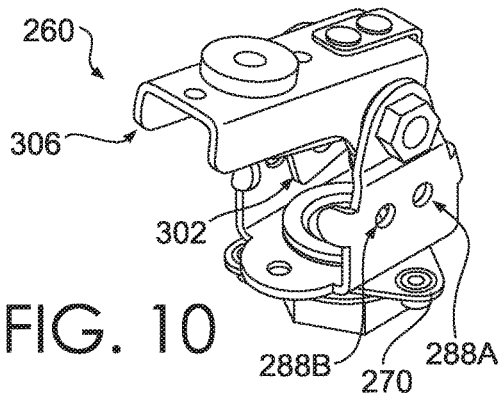
FIG. 10 is a perspective view of the connector of FIG. 9.
Figure 11:
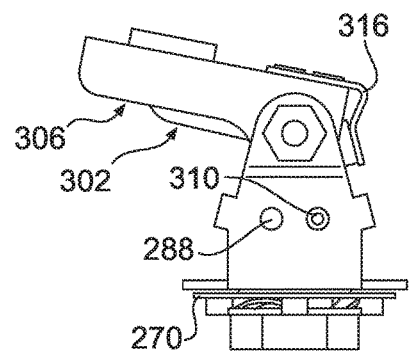
FIG. 11 is a side view of the connector of FIG. 9, in an in-use orientation.

FIGS. 9-12 depict an embodiment of coupling 260 which enables motion corresponding to both movements 3 and 4. With reference to FIG. 9, more particularly, threaded shaft 266, attached to collar 264, passes through a washer 268 and through an aperture 284 in pivot yoke 282, to be rotatably retained thereon by collar 264. On an opposite side of pivot yoke 282, another washer 268A is inserted onto shaft 266, followed by mounting plate 270, friction washer 274, washer 276, and nut 278. Mounting plate 270 is affixed to proximal arm 200, to thereby affix distal arm 300 to proximal arm 200. Thus, parts 264-284 enable a rotational attachment to proximal arm 200 corresponding to motion 3.

Pivot yoke 282 forms a clevis with apertures 284 through which a pivot pin 286 can pass. Detent arm 302 and mounting arm 306 additionally contain apertures 304, 308, respectively, through which pin 286 passes, thereby pivotally connecting detent arm 302 and mounting arm 304 to pivot yoke 282. Detent arm 302 includes a detent protrusion 310 on one or both sides thereof, which is positioned to successively resiliently engage two or more detent apertures 288 formed in pivot yoke 282, as detent arm is pivoted about pivot pin 286. In this manner, two or more detent holding positions are established for the pivot axis of detent arm 302. Detent protrusions 310 can alternatively be formed upon yoke 282, and corresponding detent apertures can be formed upon detent arm 302. Bent tab stops 290 prevent rotation of detent arm 302 beyond a predetermined range of angles.

Figure 2:
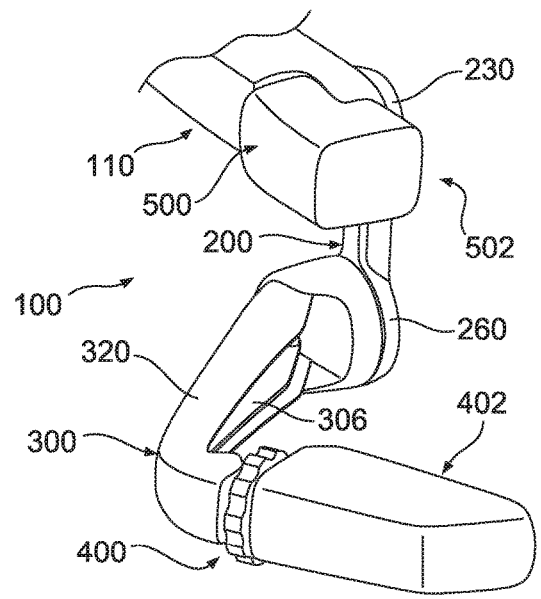
FIG. 2 depicts a portion of the device depicted in FIG. 1.

Adjusting screw 314 threads into mounting arm 306 to bear upon face 308 of detent arm 302, to determine an angle formed between detent arm 302 and mounting arm 306. Spring 316 bears against detent arm 302 to bias mounting arm 306 towards detent arm against the separating force of screw 314. As shown in FIG. 2, display boom 320 is connected to mounting arm 306, to extend away from a user's face when device 100 is worn, so that camera 402 can be positioned within the user's field of view. In an embodiment, mounting arm 306 itself forms boom 320.

Figure 12:
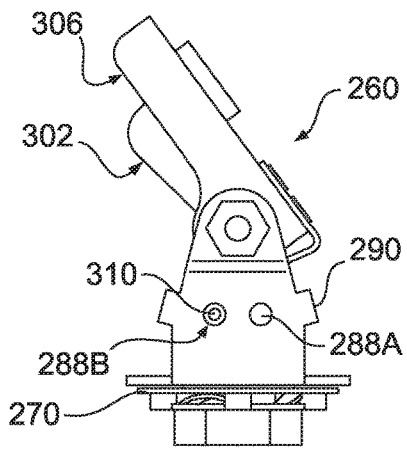
FIG. 12 is a side view of the connector of FIG. 9, in a stand-by orientation.
Figure 13:
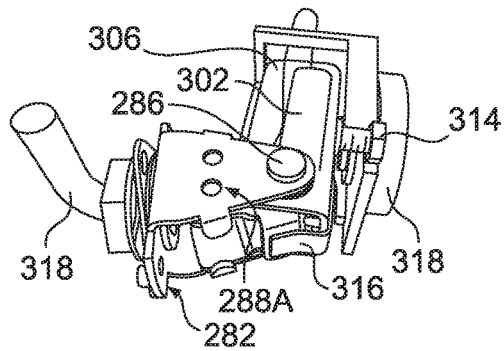
FIG. 13 is a perspective view of the connector of FIG. 9, showing a screw adjustment mechanism.
Figure 14:
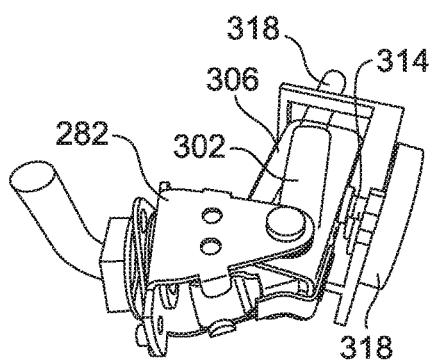
FIG. 14 depicts the connector of FIG. 9 with the screw adjustment mechanism engaged to change an angle orientation of a distal arm of the disclosure.
Figure 15:
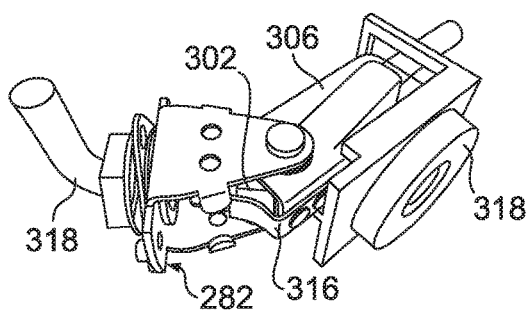
FIG. 15 depicts the connector of FIG. 9 with a detent engaged to orient the distal arm in a stand-by orientation.

FIGS. 10-11 and 13-14 depict coupling 260 in an in-use orientation, with a detent protrusion 310 engaging a first detent aperture 288A, and FIGS. 12 and 15 depict coupling 260 in a stand-by orientation, with the detent protrusion 310 engaging a second detent aperture 288B. In the in-use orientation, a longitudinal axis of detent arm 302 forms an angle with respect to a rotational axis of shaft 266 that is smaller than an angle formed in the stand-by orientation. As such, distal arm 300 lies closer to the face of a wearer of device 100 in the in-use orientation, positioning display 402 within the field of view of at least one eye. In the stand-by orientation, distal arm 300 moves farther from the face, moving display 402 to occupy less of the user's field of view, particularly directly ahead of the user. This corresponds to movement 4.

In the in-use orientation, a fine-tuning or more precise positioning of mounting arm 306, and thus boom 320, can be achieved by rotating adjusting screw 314 inwards to increase an angular displacement between detent arm 302 and mounting arm 306, or outwards to decrease the angular displacement. An adjustable standoff member positionable between detent arm 302 and mounting arm 306 is provided, in the embodiment shown as adjustment screw 314, which is illustrated in phantom view in FIGS. 13 and 14, at differing extents of adjustment. Spring 316 ensures that a biasing force is exerted against adjusting screw 314 throughout the range of adjustment, to maintain a contact between screw 314 and detent arm 302. As such, if desired or needed, boom 320 can be manually pushed against the biasing force of spring 316 to temporarily move display 402 out of the field of view. To move boom 320 without engaging spring 316, mounting arm 306 can be grasped and pivoted instead of grasping and pivoting boom 320.

FIGS. 13-15 additionally depict a routing path of an electrical cable 410 which passes through device 100 to display 402. Cable 410 may transmit either or both of signal and power, for example to provide energy and data for the operation of display 402. Cable 410 may be connected to an external module 130, which may contain one or more of a battery, a processor, data storage, a transmitter, or other component as described elsewhere herein. Cable 410, or a different cable, not shown, provides for transmission between camera 502 and either or both of display 402 and module 130. In an embodiment, no cable is provided, and display 402 includes a power source, data storage, and/or a transmitter/receiver.

Figure 16:
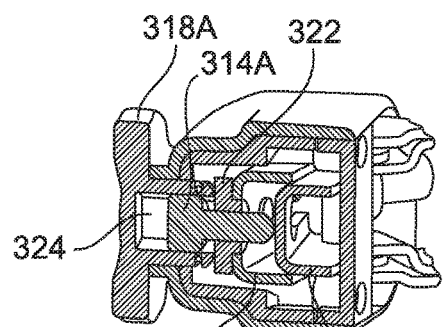
FIG. 16 depicts a cross-section of an alternative screw adjuster of the disclosure, for changing an angular relationship of the distal arm.
Figure 17:
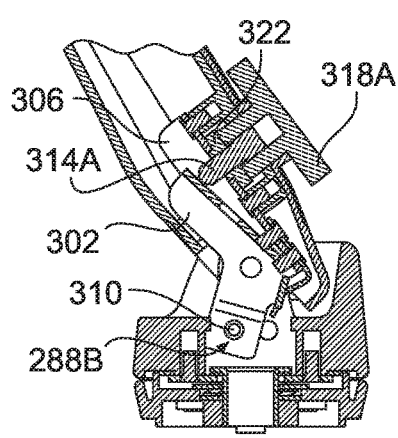
FIG. 17 is an alternative perspective of the screw adjuster of FIG. 16 with a stand-by position of the distal arm.

In the embodiment of FIGS. 16-17, screw 314A is slideably retained within adjusting knob 318A, so that screw 314 does not protrude beyond the dimensions of boom 320. A threaded screw retainer 322 is affixed to mounting arm 306, whereby rotation of knob 318A causes screw 314A to advance or retract relative to screw retainer 322. Screw 314A is engaged by, and slidingly displaced within, an interior bore 324 of knob 318A, while knob 318A is not axially displaced.

Figure 18:
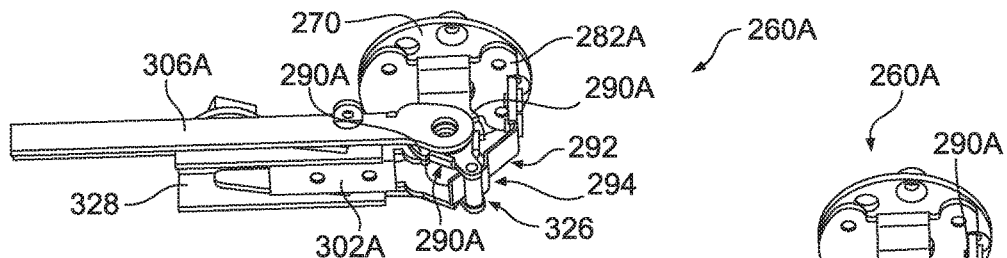
FIG. 18 is a perspective view of an alternative detent configuration of a connector of the disclosure, located between the proximal and distal arms, the arms in an in-use orientation.
Figure 19:
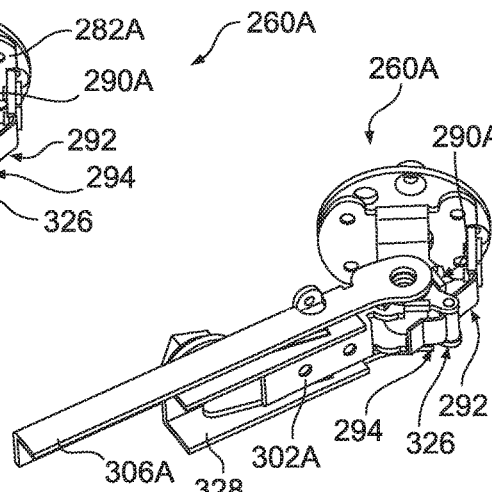
FIG. 19 is the connector of FIG. 18 in a stand-by orientation.
Figure 20:
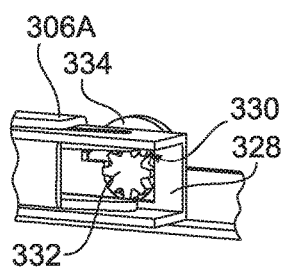
FIG. 20 is a detailed perspective view of an alternative mechanism of the disclosure for changing an angular orientation of the distal arm, including a ratchet and pawl configuration.
Figure 21:
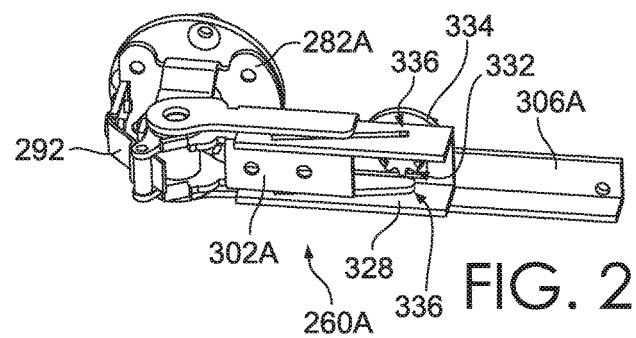
FIG. 21 is an alternative view of the configuration of FIG. 20, the distal arm in an in-use orientation.
Figure 22:
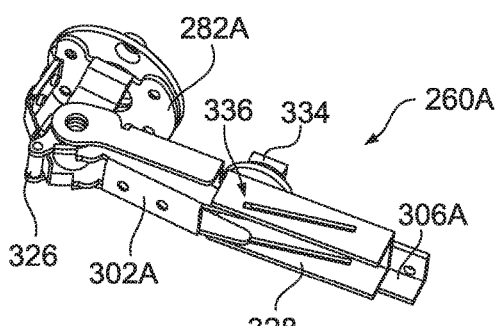
FIG. 22 is the configuration of FIG. 21 with the distal arm in a stand-by orientation.
Figure 23:
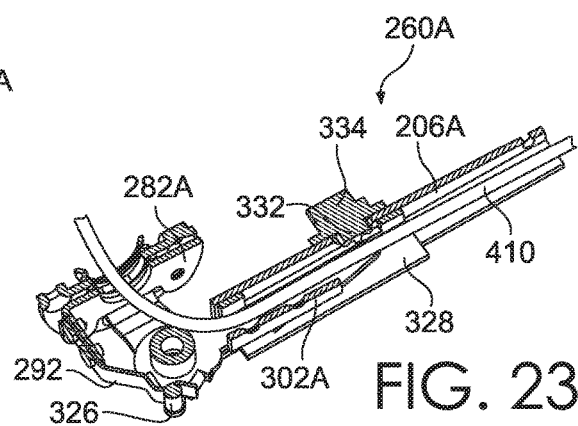
FIG. 23 is a cross-section of the configuration of FIG. 21, further illustrating a cable passing through the connector.
Figure 24:
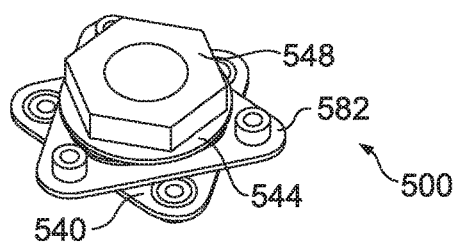
FIG. 24 depicts a perspective view of a connector of the disclosure for attaching a camera to a base of the device.
Figure 25:
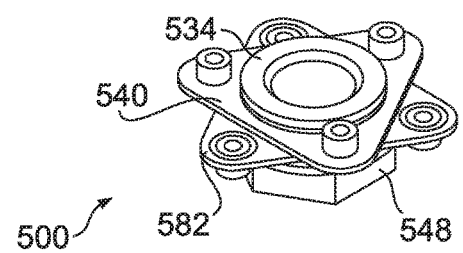
FIG. 25 is an opposite side perspective view of the connector of FIG. 24.
Figure 26:
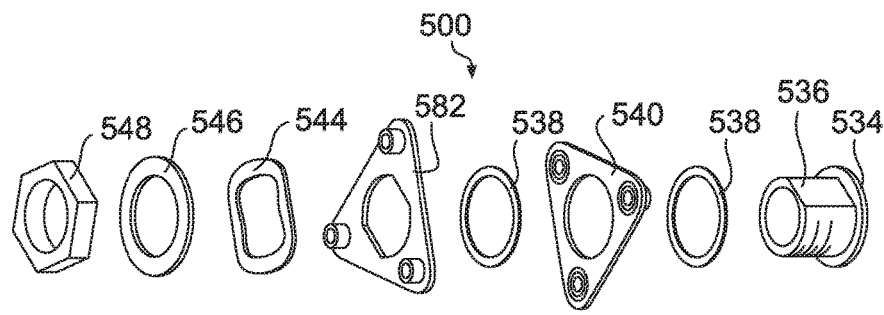
FIG. 26 is an exploded view of the connector of FIG. 24.

FIGS. 18 and 19 depict an alternative configuration for achieving an in-use and stand-by orientation of display boom 322 using connector 260A. Cam spring 292, affixed to yoke 282A, includes a cam surface 294. A cam follower 326, is affixed to detent arm 302A, and rides over cam surface 294 as detent arm 302A is pivoted about the pivot axis of pin 286 (not shown in FIG. 18). Cam surface 294 defines two resting positions corresponding to the afore-described in-use (FIG. 18) and stand-by (FIG. 19) orientations. Tab stops 290A are positioned adjacent to cam follower 326, to move together therewith, and to abut corresponding stops 298 upon yoke 282A. In this example, a roller cam follower is depicted, although other types of cam follower can be used, such as a low friction follower or other known type.

FIGS. 20-23 depict an alternative configuration for achieving a precise positioning of mounting arm 306A, and thus boom 320. Slide 328 is moved in either direction along the longitudinal axis of mounting arm 306A by a rack 330 connected to slider, which is engaged by a pinion 332 rotatably coupled to mounting arm 306A. A knob 334 is affixed to pinion 332, to enable rotation of pinion 332 by hand. One or more ramped cam surfaces 334 are formed within slide 328. Pin followers 336, connected to detent arm 302A, are positioned within cam surfaces 334, whereby when slide 328 is moved in either direction, detent arm 302A is caused to pivot about the pivot axis of pin 286. As slide 328 is confined to movement along the longitudinal axis of mounting arm, an angular relationship between detent arm 302A and mounting arm 306A is changed. Accordingly, boom 320 is moved closer or farther from a user's face, changing a position of display 402 with respect to the user's field of view.

Figure 27:
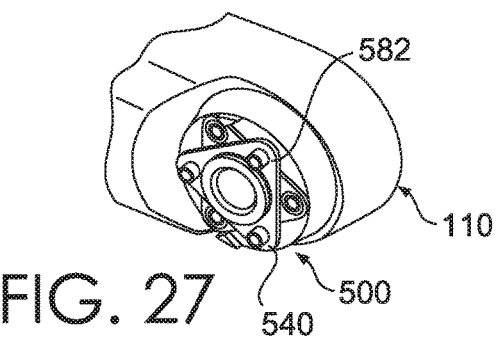
FIG. 27 is a perspective view of the connector of FIG. 24 mounted to a base of the device.
Figure 28:
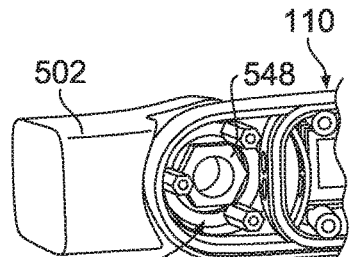
FIG. 28 is a perspective view of a camera mounted to a portion of the base using the connector of FIG. 24.

With reference to FIGS. 24-28, embodiments which include a camera can be provided with a camera connector 500 which includes stop ring 534 which is affixed to a threaded shaft 536 which passes through a friction washer 538, camera mounting plate 540, washer 538, base mounting plate 582, friction washer 544, washer 546, and nut 548. As can be seen in FIGS. 1, 27 and 28, base mounting plate 582 is affixed to base 110 opposite connector 230, and camera mounting plate 540 is affixed to camera 502. As mounting plates 540 and 582 rotate relative to each other, with a resistive force governed by friction washer 544, camera 502 is rotatable relative to base 110. Base mounting plate 582 can alternatively be mounted elsewhere upon device 100, for example upon a strap or yoke which attaches device 100 to a hat, helmet, or a user's head, or upon proximal or distal arm 200, 300, or within a housing of display 402.

Figure 29:
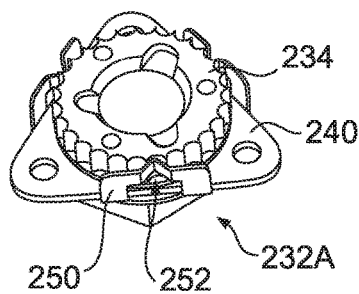
FIG. 29 is a perspective view of an alternative connector of the disclosure for mounting a camera to the base.
Figure 30:
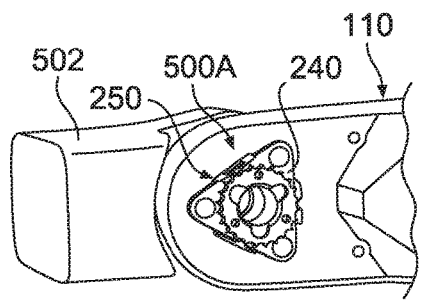
FIG. 30 is a perspective view of a camera mounted to a portion of a base of the device.

In FIGS. 29-30, connector 232A performs an analogous function as connector 500, however instead of a friction controlled positioning, a detent controlled positioning is enabled. Connector 232A contains the same components 234-252 as described for detent 232. However, in this implementation, while the mounting plate 240 of connector 232A is affixed to base 110, shaft 236 is non-rotatably threadably connected to camera 502, whereby when camera 502 is pivoted, detent gear 234 of connector 232A is engaged against cam surface 252 of connector 232A.

Figure 31:
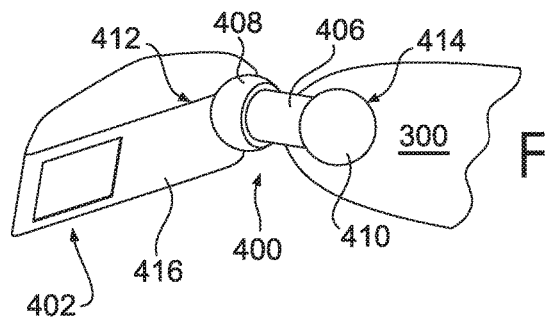
FIG. 31 is a perspective view of a connector of the disclosure for mounting an output display to the distal arm.
Figure 32:
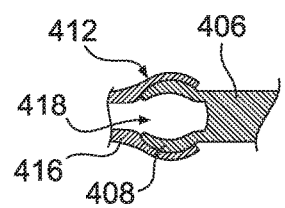
FIG. 32 is a cross-section of a socket attachment useable in the connector of FIG. 31.

FIGS. 31-32 depict a connector 400 for moveably connecting display 402 to distal arm 300. A coupling 404 includes a bar 406 supporting a spherical extension 408, 410 on opposite ends. A mating socket 412, 414 is provided within a display housing 416 and within distal arm 300, sized to receive respective spherical extensions 408, 410, respectively.

FIG. 32 illustrates one embodiment of the afore-described connector 400, in which mating socket 412, 414 receives a spherical extension 408, 410, respectively, in which the spherical extension includes a gap 418 which enables the spherical extension 408, 410 to be compressed to a smaller diameter whereby it can be resiliently snapped into its corresponding socket 412, 414 by an interference fit, to thereby exert a resilient outward force which maintains a position due to a frictional engagement with socket 412, 414. Alternatively, sockets 412, 414 can be provided upon bar 406, and mating spherical extensions can be provided upon display housing 416 and distal arm 300, respectively. In another embodiment, gap 418 is not provided, however socket 412, 414 and/or spherical extensions 408, 410 are each sufficiently resilient to enable the respective spherical extension to enter the respective socket to thereby form a mating snap connection which exerts friction once connected.

Figure 33:
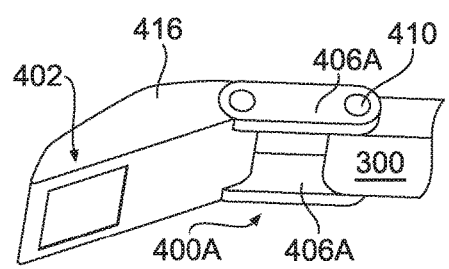
FIG. 33 is a perspective view of a dual-link connector of the disclosure for mounting a camera to the distal arm.
Figure 35:
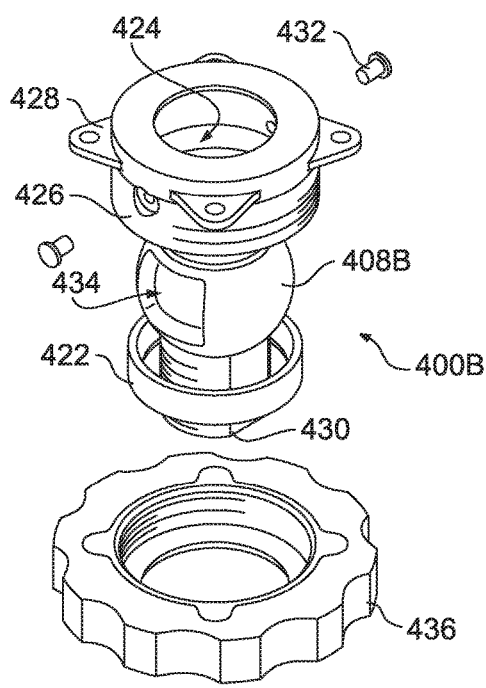
FIG. 35 is an exploded view of the connector of FIG. 34.
Figure 34:
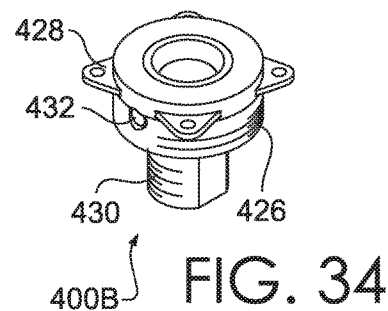
FIG. 34 is an alternative connector of the disclosure for mounting an output display to the distal arm.
Figure 36:
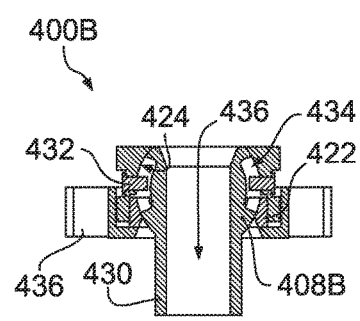
FIG. 36 is a cross-section through the connector of FIG. 34.

In FIG. 33, alternative parallel link connector 400A is depicted, in which links 406A are pivotally connected to housing 416 and bar 406A by pins 420.

In the embodiment of FIGS. 34-37, a connector 400B includes a compression ring 422 which bears against a single spherical extension 408B which in turn bears against a mating spherical bearing 424. Bearing 424 is affixed to a surrounding threaded collar 426, upon which threaded ring 436 is threaded to bear against compression ring 422, to thereby produce a desired frictional engagement between compression ring 422, spherical extension 408B, and bearing 424. A flange 428 is provided for affixing connector 400B to housing 416, and a corresponding engagement 430, enables attachment to distal arm 300. Set screws 432 enter recesses 434 in spherical extension 408B to prevent complete disengagement of spherical extension 408B. Cable 410 is passable through a channel 436 within spherical extension 408B. In various embodiments, connector B can be used in place of connector 230, 260, or 500. Connectors 400/400A/400B thus enable movements 5, 6, and 7.

Device 100 of the disclosure can be used with opaque or transparent output displays 402. It is particularly well adapted to use in industry, where display 402 may need to be repeatedly and rapidly moved out of the field of view, for example between activities involving manipulation of objects, and consulting a manual or other information visible upon display 402. Base 110 can be connected to a hard hat, helmet, or other protective head gear using any known manner, such as straps, clips, belts, resilient or spring mounted yokes, adhesive, pins, threaded fastener, or magnetic fastener, for example. Base 110 can be shaped to conform to a surface of the protective head gear. Base 110 can be positioned adjacent to the ear of a user/wearer of device 110. Where a protective ear covering is worn, for example ear muffs, base 110 can be fitted over, above, or through the protective ear covering.

In addition to display 402 and camera 502, device 100 can support other types of equipment, not shown, such as one or more of an accelerometer, sensor of any type, sound transducer, vibration generator, light source, location determining device such as a GPS or electromagnetic transmission triangulator, transmitter, receiver, electronic processor, memory/data storage, and power source, for example. One or more of the foregoing items can alternatively be associated with base 110, or may be connected to the protective head gear worn by the user, and may be connected to device 110 by wires or wireless transmission. Device 100 may obtain data for output to display 402 though wired, LTE or other cellular method, WIFI, BLUETOOTH, or near field transmission, or any other electronic communication method known or hereinafter developed.

In an embodiment, device 100 communicates with a wearer's smartphone, in order to send and receive information though the cellular network of the smartphone, and to otherwise work cooperatively with the smartphone, for example using an app executing upon the smartphone, to receive, store, send, or display information relevant to operation of device 100. In various embodiments, a processor of device 100 executes a WINDOWS, ANDROID or LINUX operating system, or other operating system.

Example Computing System

Figure 37:
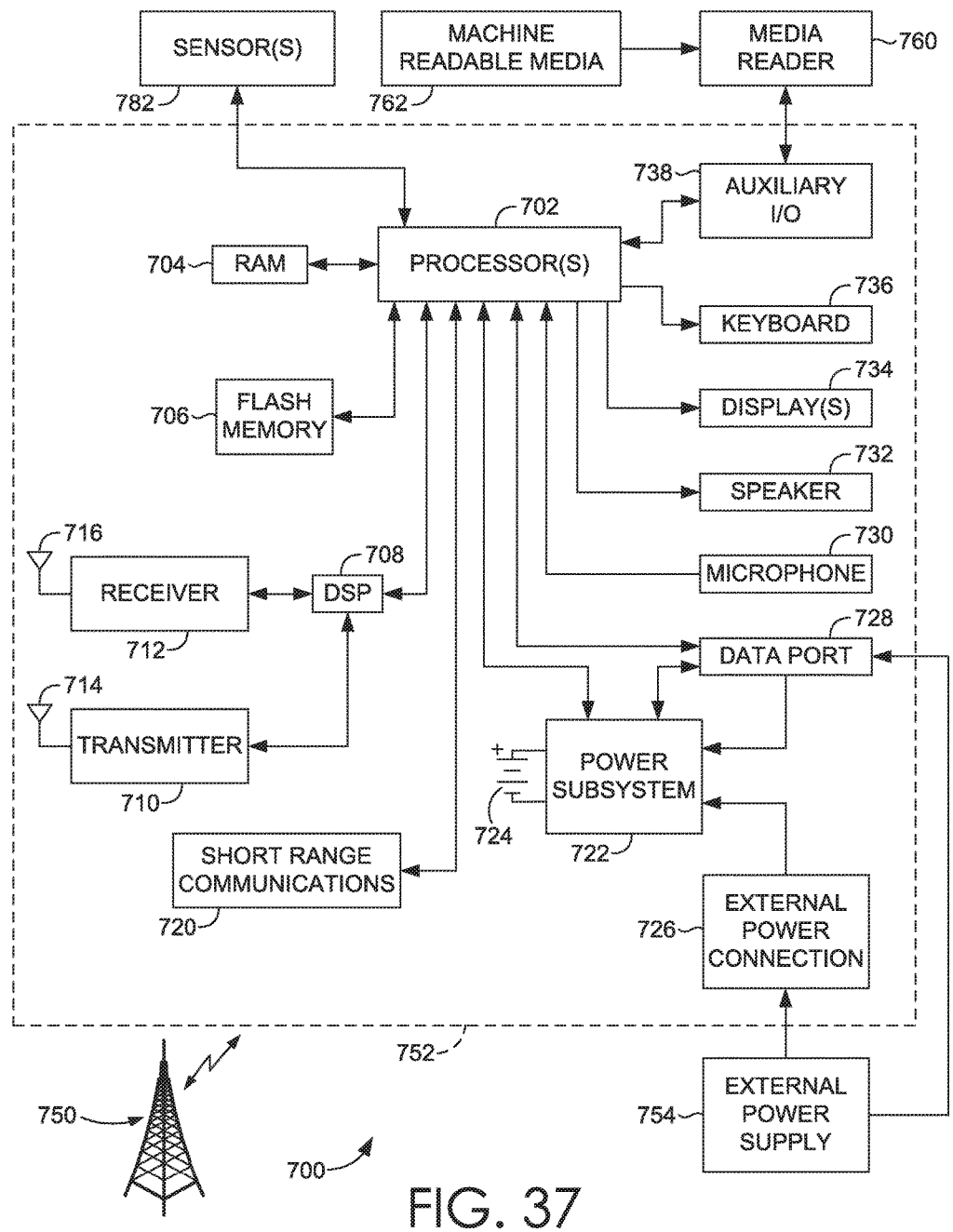
FIG. 37 is a diagrammatic view of a computing and communication system, portions or all of which are usable in carrying out the disclosure.

Base 110, proximal arm 200, distal arm 300, and/or display housing 216 can contain one or more of the electronic components listed elsewhere herein, including a computing system. An example block diagram of such a computing system 700 is illustrated in FIG. 37. In this example, an electronic device 752 is a wireless two-way communication device with voice and data communication capabilities. Such electronic devices communicate with a wireless voice or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 752 is an examplary electronic device that includes two-way wireless communications functions. Such electronic devices incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, data port 728, display 734, keyboard 736, speaker 732, microphone 730, a short-range communications subsystem 720, a power subsystem 722, and any other device subsystems.

A battery 724 is connected to a power subsystem 722 to provide power to the circuits of the electronic device 752. The power subsystem 722 includes power distribution circuitry for providing power to the electronic device 752 and also contains battery charging circuitry to manage recharging the battery 724. The power subsystem 722 includes a battery monitoring circuit that is operable to provide a status of one or more battery status indicators, such as remaining capacity, temperature, voltage, electrical current consumption, and the like, to various components of the electronic device 752.

The data port 728 is able to support data communications between the electronic device 752 and other devices through various modes of data communications, such as high speed data transfers over an optical communications circuits or over electrical data communications circuits such as a USB connection incorporated into the data port 728 of some examples. Data port 728 is able to support communications with, for example, an external computer or other device.

Data communication through data port 728 enables a user to set preferences through the external device or through a software application and extends the capabilities of the device by enabling information or software exchange through direct connections between the electronic device 752 and external data sources rather than via a wireless data communication network. In addition to data communication, the data port 728 provides power to the power subsystem 722 to charge the battery 724 or to supply power to the electronic circuits, such as microprocessor 702, of the electronic device 752.

Operating system software used by the microprocessor 702 is stored in flash memory 706. Further examples are able to use a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A predetermined set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 752 through, for example, the wireless network 750, an auxiliary I/O device 738, Data port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided to the microprocessor 702, which is able to further process the received data for output to the display 734, or alternatively, to an auxiliary I/O device 738 or the data port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 732 and signals for transmission are generally produced by a microphone 730. Alternative voice or audio I/O subsystems, such as a voice message recording subsystem, may also be implemented on the electronic device 752. Although voice or audio signal output is generally accomplished primarily through the speaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 720 provides for data communication between the electronic device 752 and different systems or devices, which need not necessarily be similar devices. For example, the short-range communications subsystem 720 includes an infrared device and associated circuits and components or a Radio Frequency based communication module such as one supporting Bluetooth® communications, to provide for communication with similarly-enabled systems and devices, including the data file transfer communications described above.

A media reader 760 connectable to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the data port 728 or computer readable program code is alternatively able to be provided to the electronic device 752 through the wireless network 750.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A device wearable upon a head of a user, the device comprising:
    a first assembly including a wearable portion;
    an arm having a first end portion connected to the first assembly and a second end portion positioned at an end of the arm opposite to the first end portion;
    an output display;
    a connector connected to the second end portion of the arm and to the output display, the connector including:
        a spherical extension,
        a spherical bearing sized and dimensioned to mateably receive at least a portion of the spherical extension,
        one of the spherical extension and the spherical bearing being connected to the second end portion of the arm, and
        the other of the spherical extension and the spherical bearing being connected to the output display,
        wherein the spherical extension and the spherical bearing provide a pivotal connection through which at least one cable passes to the output display, and
        wherein movement of the spherical extension within the spherical bearing enables positioning of the output display with respect to a visual field of the user when the device is worn; and
    an adjustable ring axially aligned with the spherical extension such that it circumscribes at least a portion of the spherical extension, wherein the adjustable ring, when rotated, increases or decreases friction between the spherical extension and the spherical bearing by adjusting a pressure applied to the spherical bearing.

2. The device of claim 1, wherein the spherical extension is receivable within the spherical bearing by an interference fit.

3. The device of claim 1, wherein the spherical extension is a first spherical extension, and wherein the first spherical extension is connected to a bar, the bar connected to a second spherical extension, the second spherical extension received within a second spherical bearing.

4. The device of claim 1, wherein the spherical extension includes a gap, whereby a diameter of the spherical extension can be changed as the spherical extension is inserted into the spherical bearing, the spherical extension thereafter resiliently expanding within the spherical bearing to resiliently engage the spherical bearing.

5. The device of claim 1, wherein the spherical extension includes a channel through which the at least one cable is passed.

6. A device wearable upon a head of a user, comprising:
    a first assembly including a wearable portion;
    an arm having a first end portion connected to the first assembly and a second end portion positioned at an end of the arm opposite to the first end portion;
    an output display; and
    a connector connected to the second end portion of the arm and the output display, the connector including:
    a spherical extension,
    a spherical bearing sized and dimensioned to mateably receive a portion of the spherical extension,
    wherein one of the spherical extension and the spherical bearing is connected to the connector,
    wherein the other of the spherical extension and the spherical bearing is connected to the output display, and
    wherein the spherical extension and the spherical bearing provide a pivotal connection;
    a compression ring that circumscribes the spherical extension;
    a threaded collar that circumscribes the spherical extension; and
    a threaded ring that circumscribes the spherical extension and is threaded onto the threaded collar, the threaded ring adjustable to bear against the compression ring to provide adjustable frictional engagement between the spherical extension and the spherical bearing.

7. The device of claim 6, wherein an axis of each of the compression ring, the threaded collar, and the threaded ring is aligned with an axis of the spherical extension.

8. The device of claim 6, further comprising a cable that passes through the spherical extension to the output display, wherein the cable is adapted to provide at least one of signal and power to the output display.

* * * * *